United States Patent [19]
Kardas et al.

[11] Patent Number: 5,767,633
[45] Date of Patent: Jun. 16, 1998

[54] ELECTRIC MOTOR DRIVE SYSTEM

[76] Inventors: Maciej Kardas, 11404 Messmore, Utica, Mich. 48317; Leonard Zembrzuski, 87-800 Wloclawek uL, Dobrzynska 12, Poland; Leonid Bogdanov, 538 E. Long Lake Rd., Troy, Mich. 48098-4839

[21] Appl. No.: 723,298

[22] Filed: Sep. 30, 1996

[51] Int. Cl.⁶ .................................. H02P 7/00
[52] U.S. Cl. ................................. 318/7; 74/84 R
[58] Field of Search ................ 318/3–15, 35–41, 318/45, 47, 85, 98–100; 74/84 R, 84 S

[56] References Cited

U.S. PATENT DOCUMENTS

| | | | |
|---|---|---|---|
| 1,953,964 | 4/1934 | Laskowitz | 74/84 R |
| 3,564,932 | 2/1971 | Lebelle | 74/84 R |
| 3,683,707 | 8/1972 | Cook | 74/84 R |
| 4,238,968 | 12/1980 | Cook | 74/84 R |
| 4,242,918 | 1/1981 | Srogi | 74/84 S |
| 5,167,163 | 12/1992 | McMahon | 74/84 S |
| 5,307,710 | 5/1994 | Feldhaus et al. | 74/574 |
| 5,622,245 | 4/1997 | Reik et al. | 192/55.1 |
| 5,643,142 | 7/1997 | Salerno et al. | 482/54 |

*Primary Examiner*—Jonathan Wysocki
*Attorney, Agent, or Firm*—Harness, Dickey & Pierce, P.L.C.

[57] ABSTRACT

An electrodynamic motor drive system, for generating enhanced rotational output, is comprised of a pair of flywheel mechanisms that are integrally connected to an output shaft. Each flywheel mechanism is energized by its own motor and is operable to temporarily engage a weighted mass that travels a path defined by the housing of the system. A pair of mass accelerators rapidly advances each flywheel mechanism during the transfer of the masses from one flywheel mechanism to the other. A component of the force generated by the continuously rotating masses is transferred through each flywheel mechanism to an output system which, in turn, causes rotation of an output shaft.

20 Claims, 10 Drawing Sheets

ELECTRIC MOTOR DRIVE SYSTEM

FIELD OF THE INVENTION

The present invention relates in general to electric motor drive systems and, more particularly, to an electric motor drive system which employs a pair of rotating masses that are guided within a housing of the drive system and are connected to a common output shaft for driving a component.

DESCRIPTION OF THE RELATED ART

It is well known in the art to provide a single electric motor drive system which includes an output shaft that drives a transmission source. However, it has been desirable to provide an electric motor drive system whereby a plurality of electric motors are associated with a single housing and provide at least one synchronized output for driving components.

It is also well known in the electric motor industry to use a central shaft or rotor that is energized due to magnetic fields that are generated by induction coil windings and the rotor. However, this arrangement inherently loses energy in the transmission of the electrical energy into the resulting mechanical energies i.e., torque, that is created by the rotating shaft. It is desirable to provide an improved electric motor drive system that can more efficiently utilize electrical energy and that provides for a symmetrical output of rotational forces. Further, it is desirable to provide an electric motor drive system that more efficiently uses electrical energies to impart motion upon a plurality of masses which, in turn, are connected to an output.

SUMMARY OF THE INVENTION

It is an object of one form of the present invention to provide an electrodynamic motor drive system that overcomes the problems mentioned above.

The preferred embodiment of the present invention provides an electrodynamic motor drive system that is comprised of a housing and a set of electric motors secured to the housing that each power their own flywheel mechanism. Each flywheel mechanism is operable to rotate a mass along a path that is defined by the housing. The mass stores energy as it is propelled along the path. Every 180 degree cycle of operation, the mass is transferred from one flywheel mechanism to the other flywheel mechanism. Each flywheel mechanism has a unique system for catching the mass, guiding the mass along the path, and then releasing the mass at a specific area along the path so that it (and its stored energy) can, without interruption, be rapidly transferred to the other flywheel mechanism. A magnetic field accelerates each flywheel mechanism, and the mass, at a predetermined portion of each cycle in order to propel the mass into the next cycle. This allows each mass to continue to build up stored energy which is transferred back and forth between each flywheel mechanism. Each flywheel mechanism is connected to a common output system which, in turn, is coupled to an output shaft for driving a member. A component of the energy stored by the rotating masses is transferred to the output shaft.

An alternative form of the invention provides as one of its aspects, a novel electric motor drive system comprised of a motor housing assembly that defines a track for guiding first and second flywheel mechanisms that are located within the motor housing assembly. First and second output shafts are respectively connected to the flywheel mechanism and, in turn, are connected to an output device that needs to be rotated. A timing belt system is connected to the first and second output shafts for synchronizing the rotational velocities of the shafts. Each flywheel mechanism has its own electronic system for energizing the flywheel mechanism in order to cause rotation of a weighted mass which is an integral part of each flywheel mechanism. A controller is provided for controlling the electronic systems in order to assure proper energization of each flywheel mechanism.

The motor drive system operates by activating the controller which, in turn, causes the electronic systems to motivate the first and second flywheel mechanisms. This, in turn, causes each weighted mass, which is indirectly connected to its corresponding output shaft, to rotate within a track defined by the motor housing assembly. As the mass rotates within the track, inertial force is generated and a component of the force vector is transferred through the flywheel mechanism to its corresponding output shaft which, in turn, increases in rotational velocity as the mass rotates. The timing belt system synchronizes the output velocities and assists the motor drive system in producing a smooth and continuous constant output.

From the following specification taken in conjunction with the accompanying drawings and appended claims, other objects, features, and advantages of the present invention will become apparent to those skilled in the art.

BRIEF DESCRIPTION OF THE DRAWINGS

FIG. 5, 6 and 7 illustrate three possible work cycles of the electric motor drive system, and for reference purposes, FIG. 6 illustrates a partial sectional view taken along the line 6—6 of FIG. 1;

It will be understood that for purposes of clarity, certain elements may have been intentionally omitted from certain views in order to enhance the understanding of the present inventions.

DETAILED DESCRIPTION

Two versions of an electric motor drive system are presented. The first version is presented in FIGS. 1 through 8. The second version is presented in FIGS. 9 through 26. The first version includes a three-piece housing 12, a pulley system 14 for synchronizing the output shafts, a first electrical system 16 and a first flywheel mechanism 18, and a second electrical system 20 for energizing a second flywheel mechanism 22.

With reference to FIGS. 1–4, the motor housing assembly 12 is comprised of an upper housing cover 24 and a lower housing cover 26 that are symmetrical components, and a center housing section 28. Conventional fasteners 30 are used to secure the center housing section 28 to the upper housing cover 24 and the lower housing cover 26 at a plurality of locations. Openings 32 are provided in the upper housing cover 24 and the lower housing cover 26 for allowing access to the pulley system 14 which includes a pair of output shafts 34 and 36. The output shafts 34 and 36 can be connected to a device such as a power takeoff shaft, or the like. It is preferred that the present system provide an output shaft rotational velocity of approximately 1200 rpm. However, it will be appreciated that the present invention can be modified to produce other pre-determined rotational velocities.

The pulley system 14 acts as a synchronizing mechanism that meters the output velocities of output shafts 34 and 36. Thus, the pulley system 14 performs the function of synchronizing the output velocities of output shafts 34 and 36 in order to provide a symmetrical output of shaft velocities. However, it will be appreciated that if synchronized output performance is not desired, the pulley system 14 can be eliminated so that the output shafts 34 and 36 could perform at varying velocities.

The primary components of the pulley system 14 include the first output shaft 34, a first pulley or gear 38, a first flexible transmission drive number 40, a center pulley or gear 42 connected to a center shaft 44, a second flexible drive number 46 connected at one end to the center pulley 42 and, at the other end connected to a second pulley/gear 48, a transfer shaft 50 that extends through the three piece housing 12, a third pulley/gear 52 that drives a third flexible drive number 54, and a fourth pulley/gear 56 that is journaled to the output shaft 36. It will be appreciated that the center pulley 42 and the center shaft 44 could be eliminated entirely and one long continuous belt (not shown) could extend between the output shaft 34 and the transfer shaft 50, if so desired.

The first output shaft 34 is rotatably journaled to the upper housing cover via a set of bearings 58. A lower section 60 of the output shaft 34 is fixed to the first flywheel mechanism 18, the details of such will be discussed later. At the upper end of the output shaft 34, the first gear 38 is connected by conventional methods and a retainer nut 62 may be used as a stop for the device to be driven (not shown) to ride against. Conventional splines 64 are provided at the outer end of the output shaft 34 assisting in the connection between the output shaft 34 and the device to be driven.

The center shaft 44 is also journaled to the upper housing cover 24 by a pair of bearings 58 and the center pulley 42 is retained on the center shaft 44 by conventional means such as a key arrangement. The transfer shaft 50 is journaled to the upper housing cover 24 by a bearing 58 and extends through a passageway 66 located in the center housing section 28, and is further journaled in the lower housing section 26 by a bearing 58. The second gear 48 and the third gear 52 are journaled to the transfer shaft 50 by conventional methods. Likewise, the fourth gear 56 is journaled to the second output shaft 36 by conventional methods. Bearings 58 are used to journal the output shaft 36 to the lower housing cover 26 and the lower section 60 of the output shaft 36 is fixed to the second flywheel mechanism 22 such that they rotate with one another. It is preferred that the shafts and housing be made from steel.

The pulley system 14 provides a connection between the output shafts 34 and 36 to cause synchronization of said shafts during output. If synchronization is not desired, the pulley system 14 essentially could be eliminated. The pulley system 14 also acts as a balancing mechanism for providing smooth operation of the first flywheel mechanism 18 and the second flywheel mechanism 22 which will be discussed later.

Figure 1:
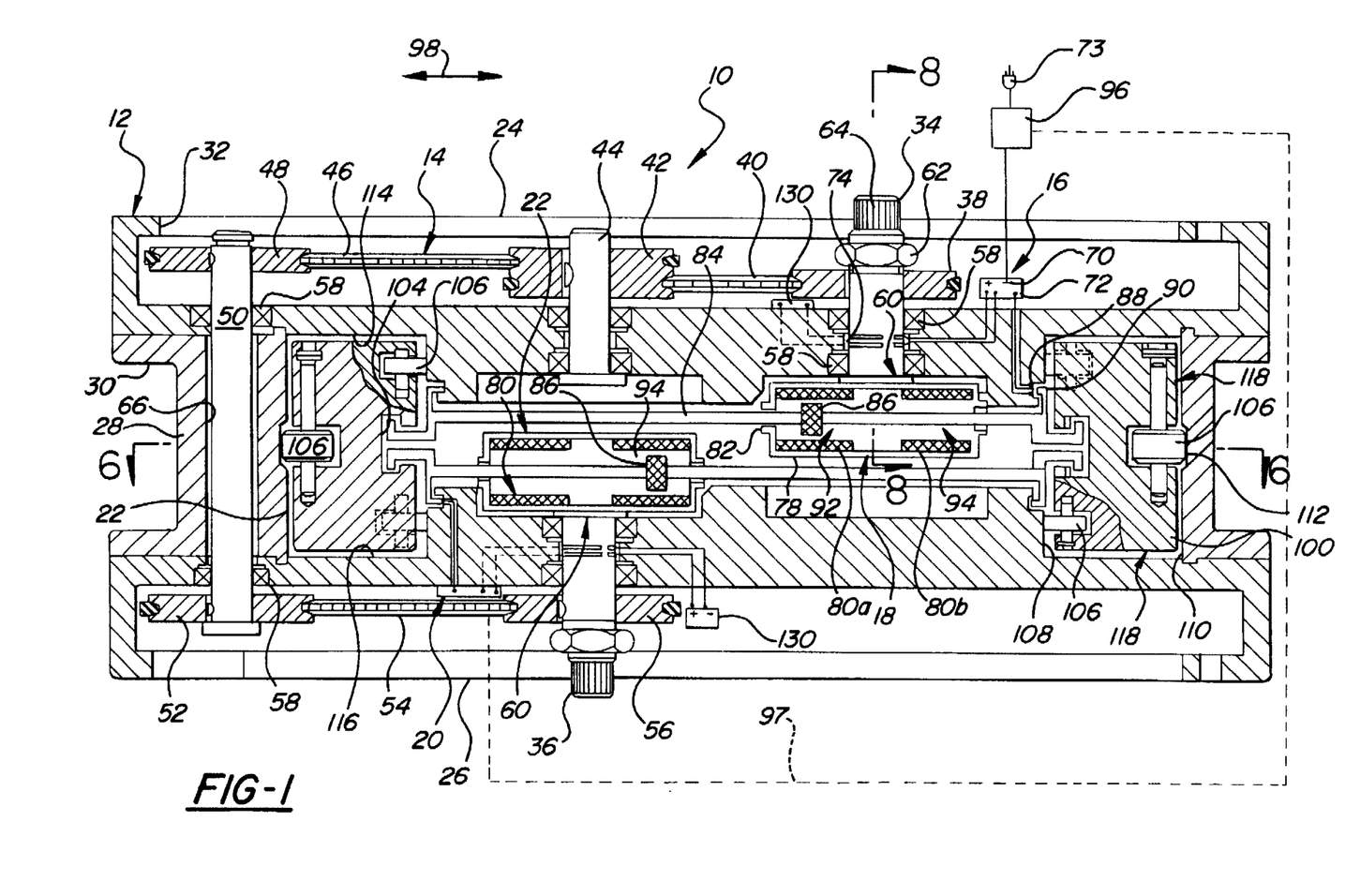
FIG. 1 is a partial side cross-sectional view taken along line 1—1 of FIG. 2, showing the major components of an alternative electric motor drive system.
Figure 2:
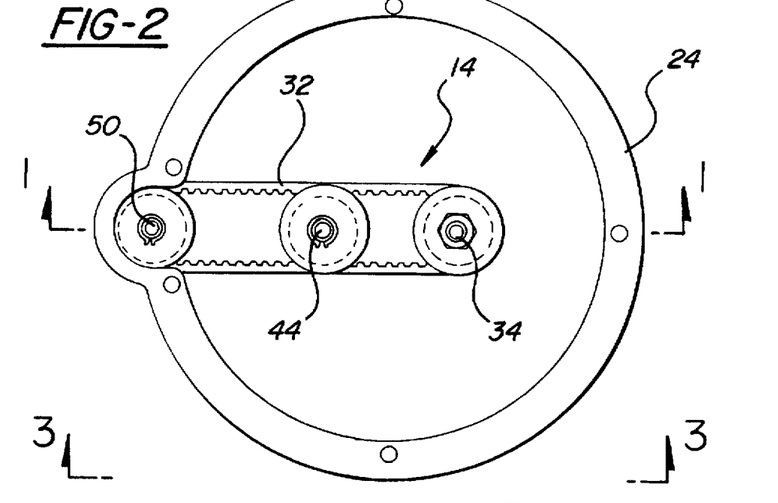
FIG. 2 is a top plan view of the drive system and part of the pulley system as illustrated in FIG. 1.
Figure 3:
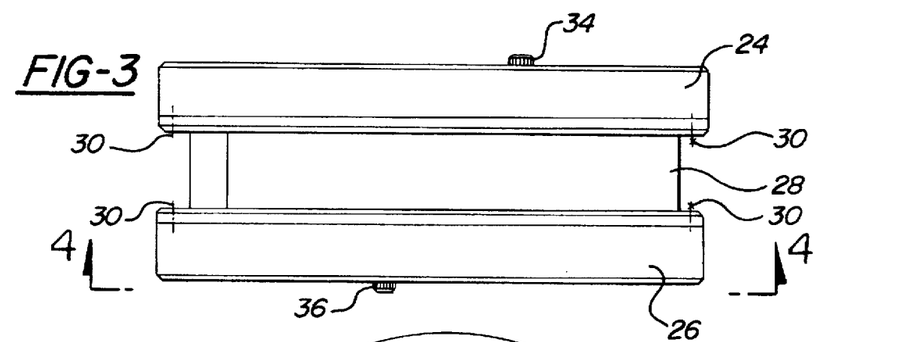
FIG. 3 is a side elevational view taken from the direction of line 3—3 of FIG. 2, showing the primary components of the housing assembly which include a center housing section and two housing covers.
Figure 4:
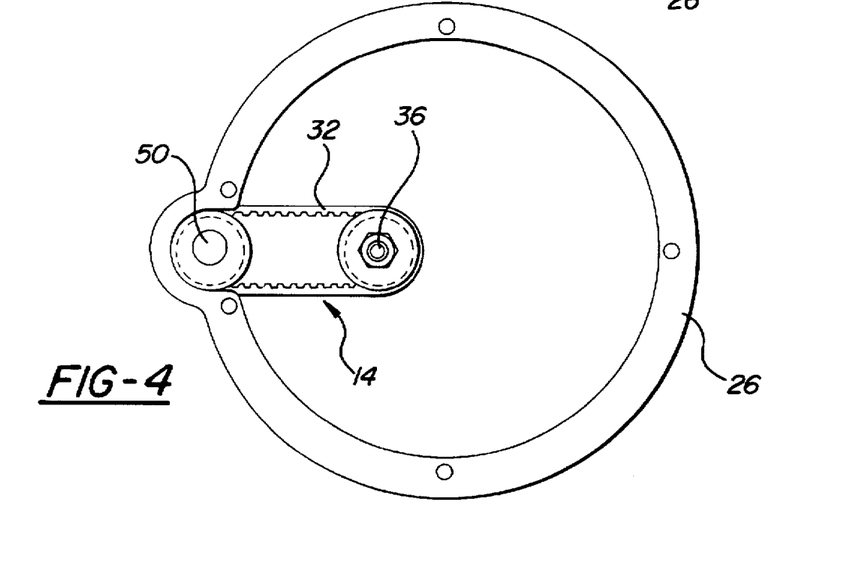
FIG. 4 is a bottom view taken from the direction of line 4—4 of FIG. 3, showing the lower housing cover in relation to the pulley system.
Figures 5, 6, 7:
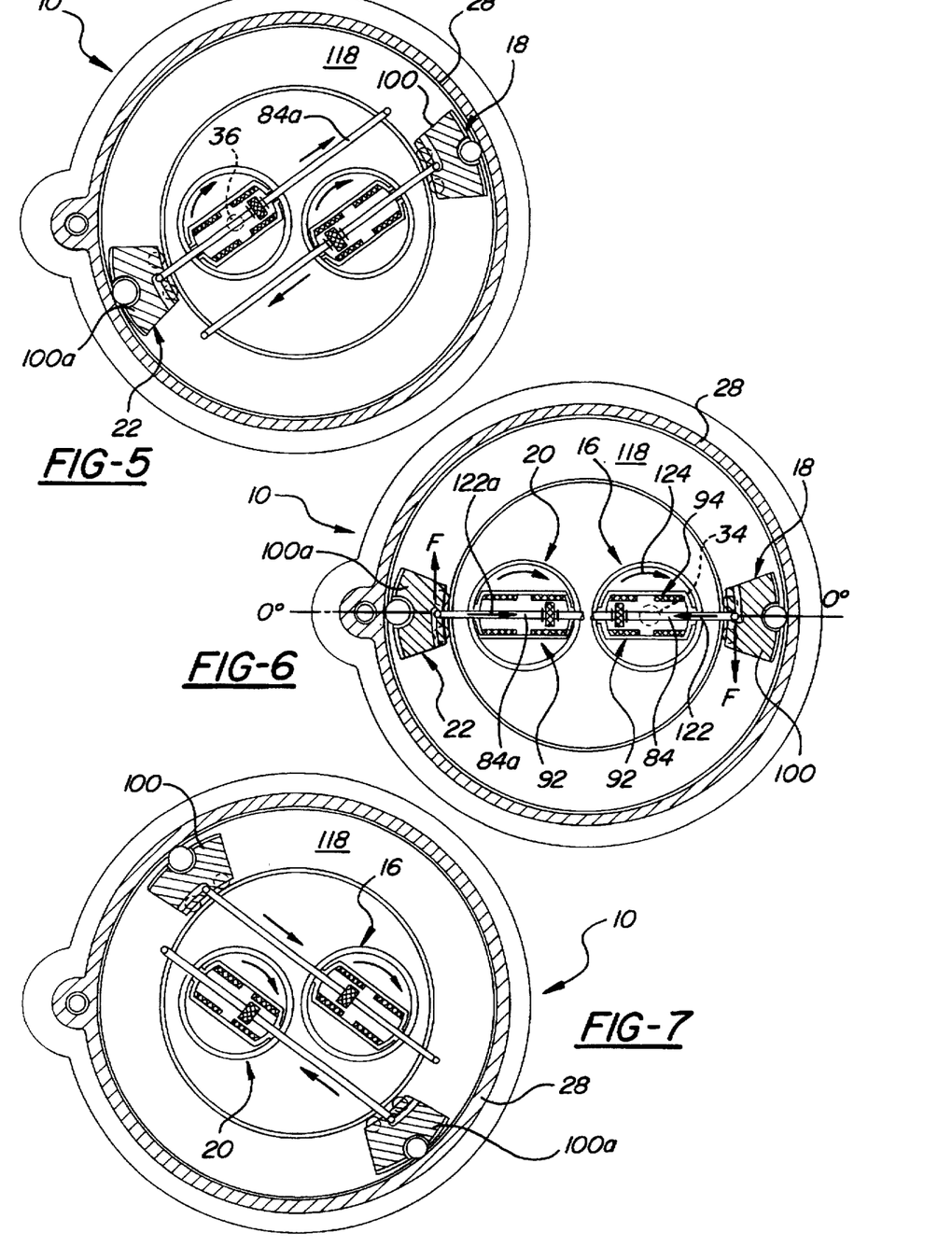
Figures 8, 10:
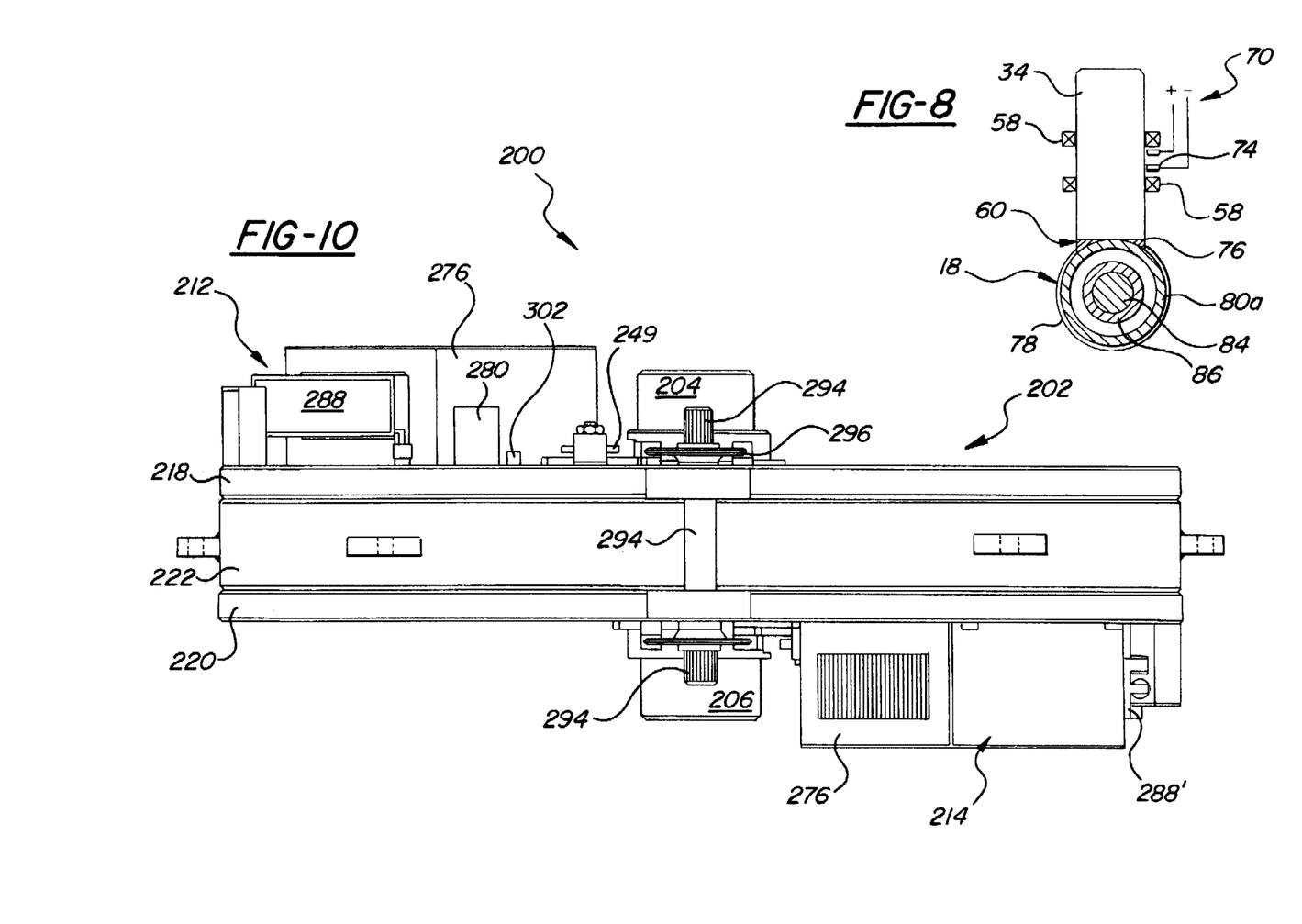
FIG. 8 is a partial side cross-sectional view taken along line 8—8 of FIG. 1, showing the output shaft connected to the flywheel housing and the induction coil, and core shown in relation to the reciprocating rod that make up the flywheel mechanism.
FIG. 10 is a side elevational view taken from the direction of line 10—10 of FIG. 9, showing the housing assembly, the electric motors, the mass accelerator system, and the output system.
Figure 9:
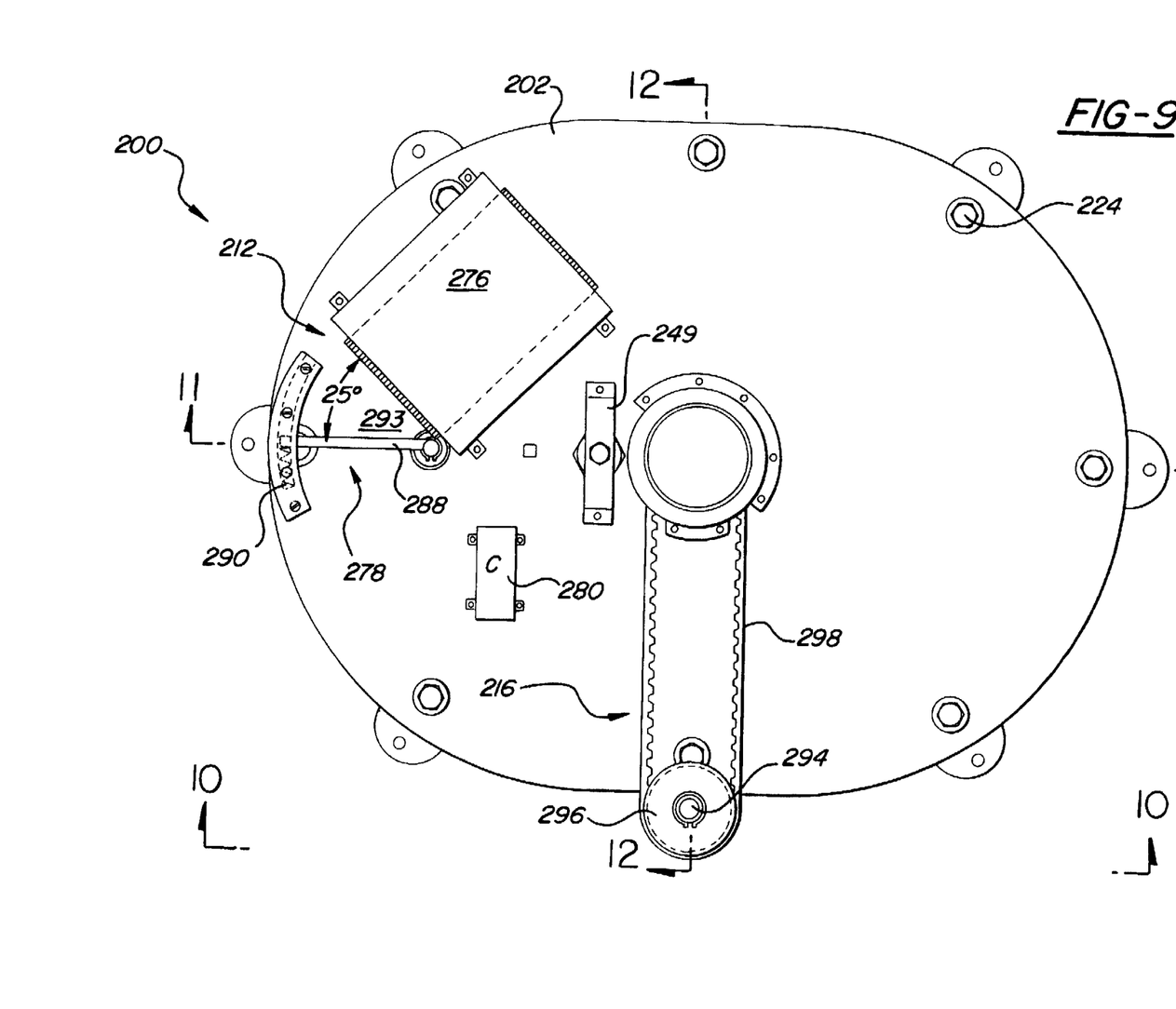
FIG. 9 is a top plan view of the preferred electric motor drive system.

Referring now to FIGS. 1, 5 and 8, the first electrical system 16 and the first flywheel mechanism 18 will now be discussed. It is to be understood that the first electrical system 16 and the second electrical system 20 are substantially similar and therefore only a discussion of the first electrical system 16 will be presented. Likewise, it will be understood that the first flywheel mechanism 18 and the second flywheel mechanism 22 are substantially similar and therefore, only a discussion of the first flywheel mechanism 18 will be presented. The electrical system 16 includes an input 70 and 72 from a conventional power source 73. A set of rings 74 surround the output shaft 34 and act as brushes for providing electrical continuity to the output shaft 34 from the input 70. The lower end of the shaft 60 is fixed at area 76 to a flywheel housing 78 that surrounds a split induction coil 80a and 80b. It is preferred that the flywheel housing 78 be cylindrical in construction and have openings 82 at opposing ends for receiving an elongated metallic rod 84. A core 86 is fixed to the rod 84 and is positionable within the flywheel housing 78 and carries a positive charge delivered to it by the second input 72. Another set of rings 88 are in electrical contact with the second input 72 and cause an electrical connection with an upturned section 90 of the elongated rod 84. The electrical connection between the upturned section 90 and the rings 88, causes the rod 84 to be positively charged which, in turn, positively charges core 86. Because core 86 is positively charged and the induction coil 80 is negatively charged, an electrodynamic motor arrangement is created which is operable to impart motion to the flywheel mechanism 18.

The induction coil 80 is split up into a first section 80a and a second section 80b for creating an oscillating or switching magnetic field within the flywheel housing 78. That is, during a predetermined portion of the work cycle, i.e., during the first 180 degrees of the cycle, a first field 92 within the final housing 78 is energized thus causing the core 86 to move to its first field position (as shown in FIG. 1). Likewise, during the second predetermined time period of the work cycle, i.e., during 181 degrees–360 degrees of the cycle, first field 92 is de-energized while induction coil 80a is energized which in turn causes a second magnetic field 94 to activate. This causes the core, and the shaft 84 that it is affixed to, to move to the second field position 94 (not shown) within the flywheel housing 78. A control mechanism 96 varies the electrical input signals 70 and 72 thus causing this switching function of the magnetic fields 92 and 94. It will be appreciated by those skilled in the art that the control mechanism 96 can be designed, and/or programmed, to perform various results and in order to change the performance characteristics of how fast rod 84 reciprocates in the direction of arrow 98. The control mechanism 96 is in electrical connection 97, with the first electrical system 16 and the second electrical system 20 and is operable to control electrical signals that cause sequenced energization of the first flywheel mechanism 18 and the second flywheel mechanism 22. Location of the control mechanism 96 could be within the housing 12 or as shown.

With continued reference to FIGS. 1 and 5, the first flywheel mechanism 18 includes the elongated rod 84 that is connected to a weighted mass 100 by a loose-fit connection between an upturned portion 102 at the end of the rod 84 and a slot machined within the mass 100. The weighted mass 100 includes three sets of rollers 106 which are pinned 108 to the weighted mass 100 by conventional methods. The weighted mass 100 thus is an assembly which includes the rollers 106 which together, are guided within a track 118 as defined by the housing 12. More specifically, the center housing section 28 defines an inner wall 108 and an outer wall 110 for the rollers 106 to glide upon. Also, a recess 112 is provided within the center housing for guiding the large roller 106 which, in turn, maintains the weighted mass 100 in proper alignment with the housing 12. Further, upper wall 114 of the upper housing cover 24 and lower wall 116 of the lower housing cover 26 together in connection with the inner wall 108 and the outer wall 110 define a track 118 for the weighted mass 100 to ride within and to be guided by.

The primary components of the first flywheel mechanism 18 includes the flywheel housing 78 that is fixed by a weld or other means to the shaft 34, the elongated rod 84 that is slideably positioned relative to the flywheel housing 78, a core 86 that is fixed to the rod 84, and the weighted mass 100 and its roller assemblies 106. Thus, the weighted mass 100 is indirectly connected to the output shaft 34 whereby a force vector component F of the inertial forces generated by rotating the mass 100 within the track 118, is transferred to the output shaft 34. This arrangement is believed to provide a more efficient electrodynamic motor drive transfer system than conventional electrodynamic motor systems. This is due to the harnessing effect of capturing the inertial energy generated by the rotating mass 100 and transferring it to the output shaft 34. It will be appreciated by those skilled in the art that the second flywheel mechanism 22 has construction that is similar to its counterpart, the first flywheel mechanism 18, and thus no further discussion is necessary.

The primary components of the electric motor drive system 10 have been described. Accordingly, with reference to FIGS. 5–7, a discussion of the method of operation of the drive system 10 will now be presented. The control mechanism 96 produces a signal to inputs 70 and 72 thereby energizing the magnetic fields 92 and 94 within the flywheel housing 78. Two electrical systems, 16 and 20, and flywheel mechanisms, 18 and 22, are included in the electric motor drive system 10. A control mechanism 96 is preferred for operating both electrical systems, 16 and 20, in order to assure smooth operation of the drive system 10.

Once the electrical systems 16 and 20 have been energized, the magnetic fields 92 and 94 cause core 86 to move the rods 84 in their corresponding directions as indicated by arrows 122. This causes mass 100 to ride within the track 118 which causes output shaft 34 to rotate clockwise as indicated by the arrow 124. Likewise mass 100a is pulled in the direction of arrow 122a by rod 84a. This sequence continues as long as the magnetic fields 92 and 94 continue to switch back and forth (i.e., every 180 degrees of the work cycle) thus causing continuous rotational motion of the masses 100 and 100a. This action generates inertial Force where F=ma and m is the mass of weight 100 and a is the acceleration of the mass. Bar 84 defines a moment arm where torque is defined by the product of the length of the moment arm and the force F. This torque is transferred along the shafts 84 and 84a and out to their corresponding output shafts 34 and 36. However, because the output shafts 34 and 36 are synchronized, i.e. controlled by the pulley system 14, a nearly constant continuous output velocity of the shafts is generated.

FIG. 6 is a simplified partial cross-sectional view taken along line 6—6 of FIG. 1 with the rods 84 shown broken for illustration purposes. The position of the flywheel mechanisms 18 and 22 are shown at the 0 degree position of the work cycle. At this position, the torque is at its lowest value. FIG. 7 illustrates yet another position of the flywheel mechanisms 18 and 22 during approximately the 225 degree position of yet another period of the work cycle of the electric motor drive system 10. And finally, FIG. 5 illustrates another position of the flywheel mechanisms 18 and 22 during approximately the 315 degree position of the period of the work cycle of the system 10. It is contemplated that the inertial Forces generated by the rotating masses 100 and 100a will steadily increase as the magnetic fields 92 and 94 increase in activity. This increase in inertial Force translates to an increase in shaft rotational velocity. Accordingly, it is believed that less energy is required to rotate the output shafts than conventional electrodynamic motors.

An alternative embodiment employs a capacitor 130 that is operable to harness the excess electricity that may be generated by the mass in motion. The excess energy stored in the capacitor 130 can be used to run an auxiliary device, if so desired.

The preferred version of the present invention is depicted in FIGS. 9 through 26. Specifically, FIGS. 9 through 12 depict the primary components of the preferred electric motor drive system 200. The system 200 is comprised of a housing 202, motors 204 and 206, an upper flywheel mechanism 208 and a lower flywheel mechanism 210, mass accelerators 212 and 214, and an output system 216.

Figure 11:
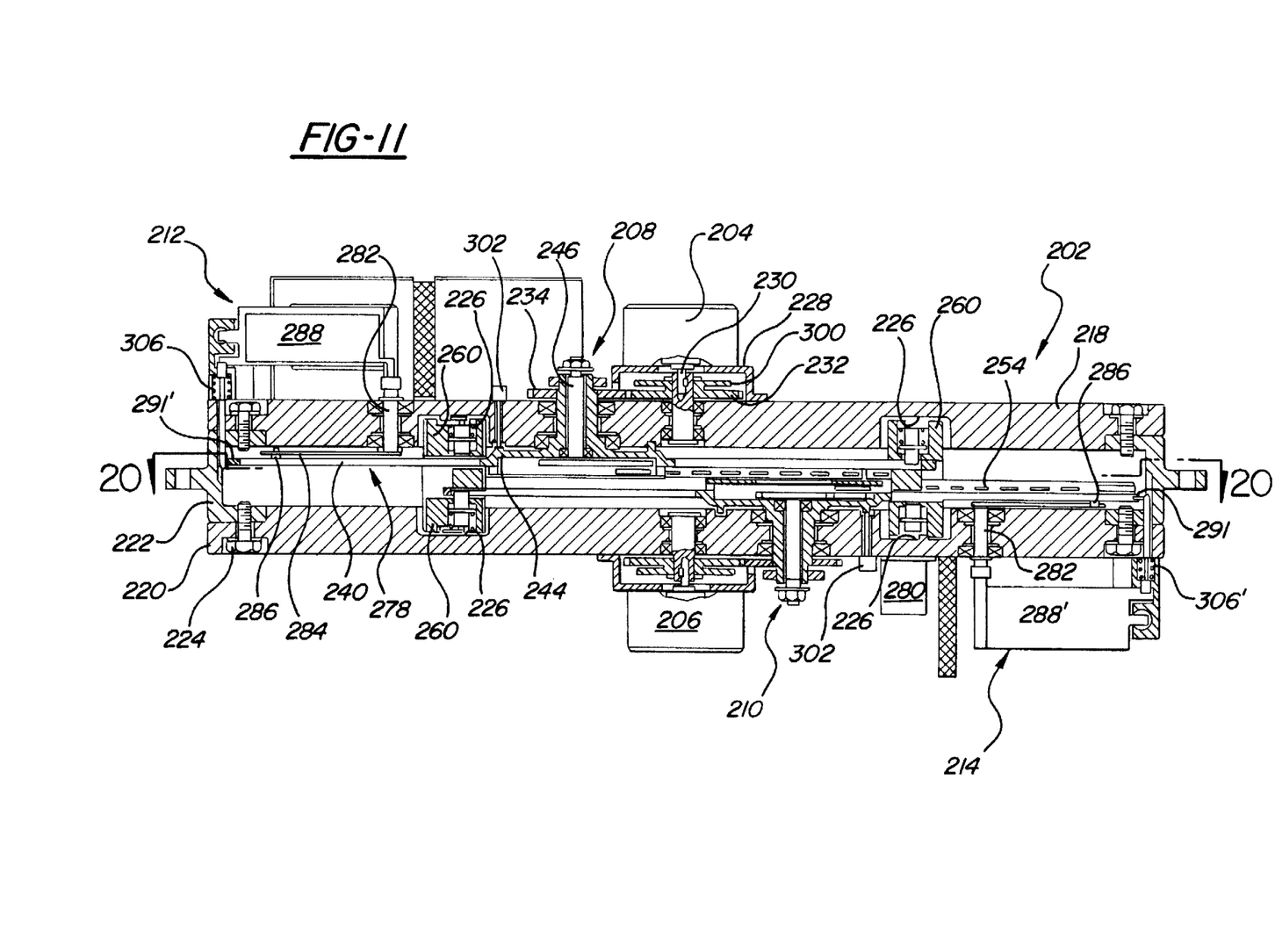
FIG. 11 is a side cross-sectional view taken along line 11—11 of FIG. 9, showing the motor housing, motors, flywheel mechanisms, and the mass accelerator.
Figure 12:
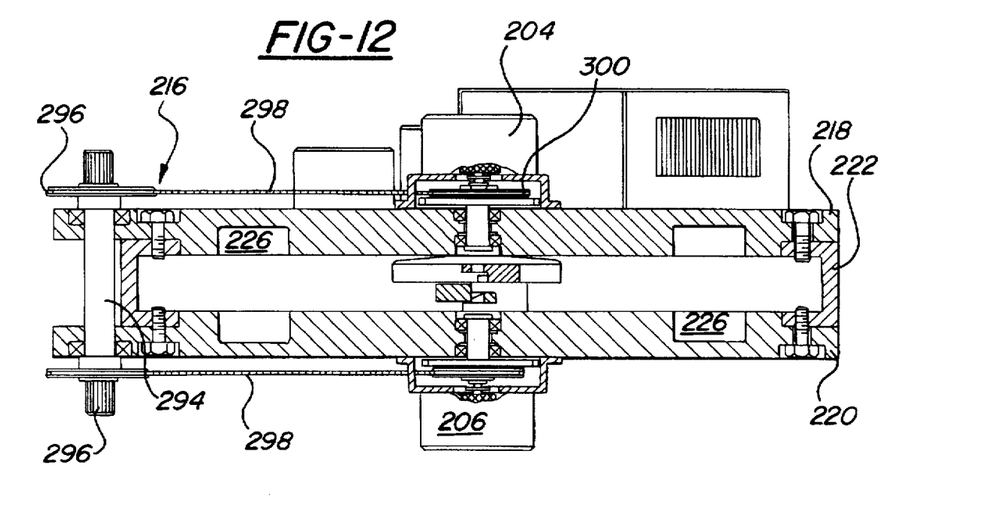
FIG. 12 is a side cross-sectional view taken along line 12—12 of FIG. 9, showing the housing section and motors in relation to the output system.
Figure 13:
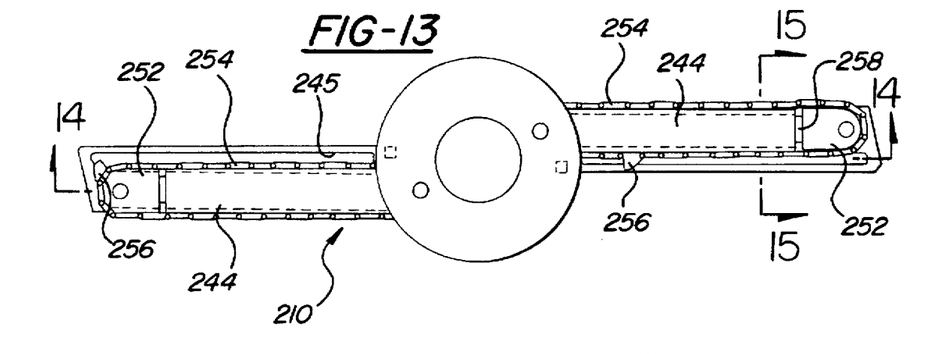
FIG. 13 is a top plan view of the lower flywheel mechanism that is located within the housing assembly.
Figure 14:
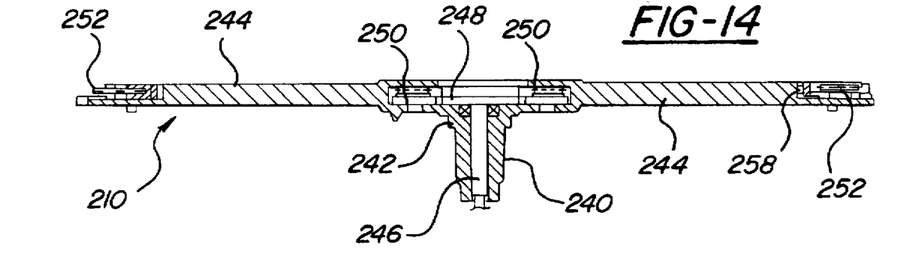
FIG. 14 is a side cross-sectional view taken along line 14—14 of FIG. 13, showing components of a flywheel mechanism including a main gear and a pair of satellite gears located at distal positions on the frame.

With specific reference to FIG. 11, the housing 202 has an upper section 218, a lower section 220, and an intermediate section 222. The sections are secured together by suitable fasteners 224 that are located around the perimeter of the housing. The upper and lower housing sections are substantially symmetrical and each section is preferably made of metal. Each upper and lower housing section has a groove or track 226 located therein that defines a pathway for a weighted mass to follow. The path is preferably a mathematical ellipse.

Figures 16, 17, 18, 19, 26:
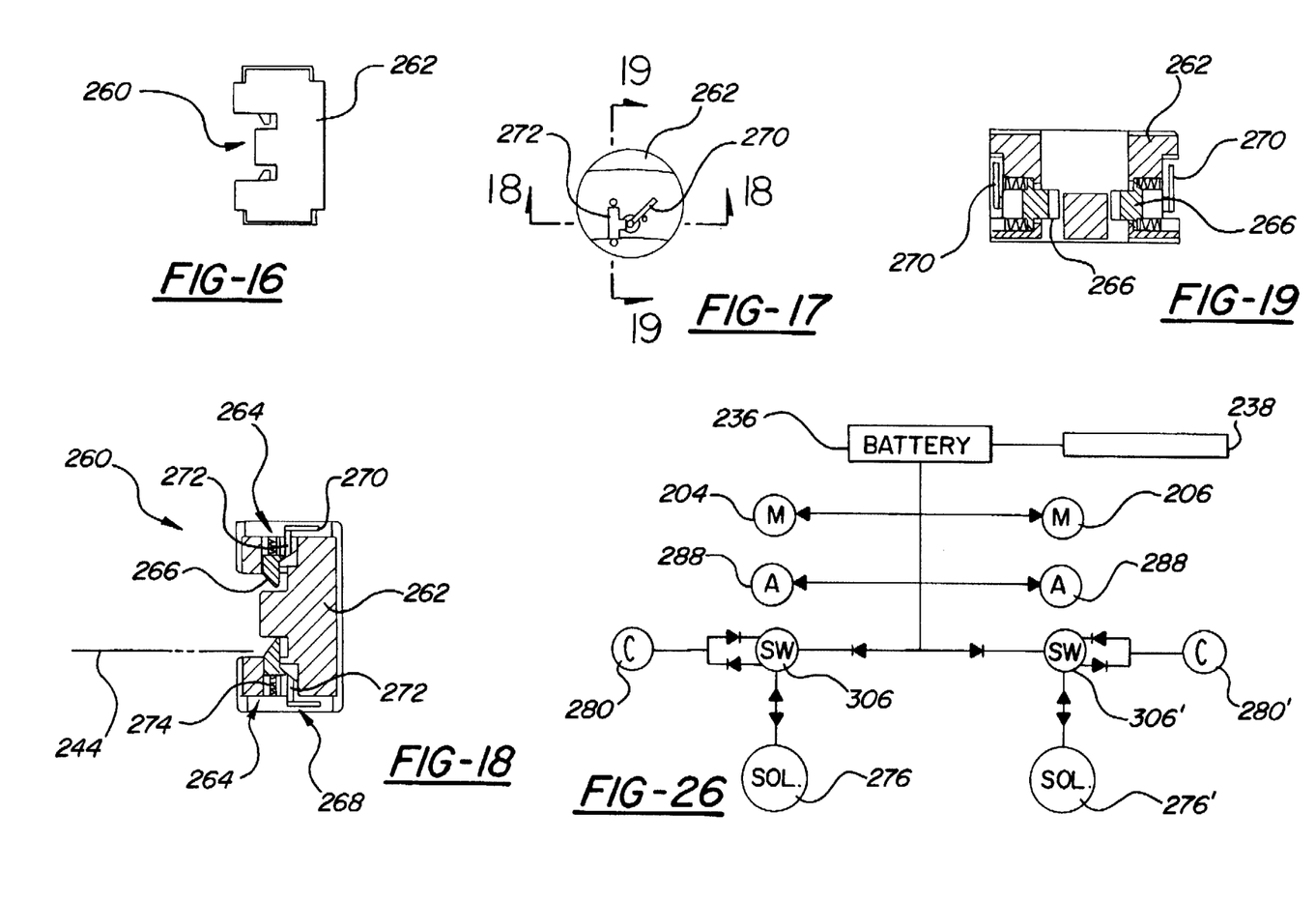
FIG. 16 is a front view of one of the weighted masses.
FIG. 17 is a top view of the weighted mass.
FIG. 18 is a side cross-sectional view taken along line 18—18 of FIG. 17, showing the weighted mass including its body, the catch mechanism, and the trigger mechanism.
FIG. 19 is a cross-sectional view taken along line 19—19 of FIG. 17, showing the body, catch mechanism, and the trigger mechanism.
FIG. 26 illustrates an electrical schematic for the present invention.

The motors 204 and 206, and their associated bracketry and drive members, are essentially the same and thus, only a discussion of motor 204 will follow. Motor 204 is a conventional DC motor that contains sufficient capacity to operate its upper flywheel mechanism 208 at approximately 2400 revolutions per minute. The motor 204 is secured to the housing 202 by bracketry 228 and has an output shaft 230 connected to a drive pulley 232 which in turn drives a driven pulley 234 that is fixed to the upper flywheel mechanism 208. The motors are connected in parallel to a source, for example, a battery 236 (FIG. 26). An alternator 238 can be used to maintain the battery's charge. The motors are controlled by conventional switches, not shown.

The lower flywheel mechanism 210 is depicted in FIGS. 11 and 13 through 15. Because the upper flywheel mechanism 208 and the lower flywheel mechanism 210 are essentially the same, only a discussion of lower flywheel mechanism will be present. The lower flywheel mechanism 210 has a metal frame 240 which includes a centrally located upwardly extending section 242 and a pair of outwardly extending arms 244. The section 242 is journaled to a fixed shaft 246 which allows the lower flywheel mechanism 210 to freely rotate about the shaft as driven pulley 234 rotates. The fixed shaft 246 has a main gear 248 secured to its upper end and a strap 249 (FIG. 9) secured to its other end. The strap 249 is fixed to the upper housing section 218. A pair of inner gears 250 are journaled to the central section 242 and mate with the larger main gear 248. A pair of outer or satellite gears 252 are journaled to the outer ends of each arm 244. A pair of flexible linking members, for example, chains 254, connect each inner gear 250 to its satellite gear 252. Each chain 254 has a tang 256 that engages the weighted mass and propels the mass along the track 226.

Figure 15:
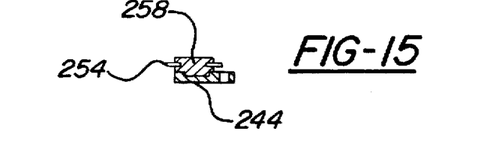
FIG. 15 is a partial cross-sectional view taken along line 15—15 of FIG. 13, showing the chain tension mechanism relative to the frame and the chain.

Referring now to FIG. 15, a spring-biased tension mechanism 258 is slideably connected to each arm 244 and allows the appropriate tension to be maintained on the chain 254. A dove-tail type connection can be used to connect the mechanism 258 to the arm 244.

Referring to FIGS. 16 through 19, the weighted mass 260 is illustrated. While the system 200 employs two masses 260 and 260', one for each flywheel mechanism 208 and 210, they are identical and thus only a discussion of one is necessary. The weighted mass 260 includes a body 262 and pair of catch mechanisms 264 located at opposite ends of the body 262. The body 262 is symmetrically shaped and each catch mechanism 264 is identical. The weighted mass 260 is of sufficient size to be received within the track 262 and is capable of being temporarily connected to the slot 245 of an arm 244 (shown in phantom) because of the catch mechanism 264. Each catch mechanism 264 includes a spring-loaded pawl 266 that is biased inwardly in order to lock the arm 244 in place. This allows the mass to be temporarily connected to the arm 244 as the lower flywheel mechanism 210 rotates. When the lower flywheel mechanism 210 reaches approximately the 180 degree position of its cycle, the mass must be released so that it can be transferred to the upper flywheel mechanism 208. This is accomplished by an automatic mass releasing mechanism 268 which includes a lever 270 that is pivotally connected to the body 262. Connected to the lever 270 is a cam member 272 that is operable to engage the pawl 266 to cause it to react against the spring and move outwardly. This action causes the arm 244 to be automatically released as it continues to rotate. The mass 260 is then free to be picked up by the other flywheel mechanism where the process is repeated. The mass 260 is preferably made of metal and has a sufficient smooth surface about its perimeter so that it is free to glide within the track 226.

With reference to FIGS. 9 through 12, the mass accelerators 212 and 214 provide an additional boost of energy to the weighted masses 260 and 260' as they traverse the track 226. Mass accelerator 212 is connected to the upper housing section 218 and is used to energize the upper flywheel mechanism 208 and its connected mass 260. The other mass accelerator 214 is connected to the lower housing section 220 and is used to energize the lower flywheel mechanism 210 and its mass 260'. Each mass accelerator 212 and 214 has a solenoid 276, an oppositely charged swing arm assembly 278, and a capacitor 280 for storing excess energy between cycles. One cycle equals one complete revolution of the flywheel mechanism. The masses 260 and 260' are exchanged once per revolution.

The swing arm assembly 278 includes a central shaft 282 that extends through the upper housing section 218 and is journaled thereto. An arm 284 is secured to the lower end of the shaft 282 and is operable to engage the frame 240 by catch pawl 286. The upper end of the shaft 282 has connected to it an armature 288 that is charged opposite to the solenoid 276. A spring-biased return mechanism 290 is connected to the housing 202 and operates to return the swing arm assembly 278 back to its original position. A lever 291' (FIGS. 11 and 20) is part of an electrical switch 306 and is operable to engage the upper flywheel mechanism 208. When the arm 244 of the upper flywheel mechanism 208 engages the lever 291', the switch 306 is activated causing the magnetic field of the mass accelerator 212 to be energized. This causes rapid advancement of the mass 260 within the track 226. The swing arm assembly 278 is operable to rotate between the 0 degree position (see FIG. 9) and approximately a 25 degree position in order to catapult the flywheel mechanism 208, in a clockwise direction. This in turn rapidly accelerates the mass 260 along the pathway defined by the track 226. Once the swing arm assembly 278 reaches the approximately maximum 25 degree position, switch 302 deactivates the solenoid 276 thus de-energizing the magnetic field 293. Return mechanism 290 then thrusts the swing arm 278 back to the 0 degree position.

The solenoid 276 preferably is capable of discharging and recharging at the frequency rate of ten times per second. Any excess energy generated during this brief time period, is stored in the capacitor 280. If the capacitor 280 becomes so discharged that is cannot re-energize the magnetic field 293 necessary for the next cycle, then the system will draw upon the battery 236. The battery can be recharged by the alternator 238 which can be connected to one of the rotating shafts of the present system 200. The capacitor 280 can be secured to the upper housing section 218.

The output system 216 transmits the energy generated by the rotating masses 260 to a common output shaft. Referring to FIGS. 9 through 12, the output system 216 includes a common output shaft 294 that is journaled to the upper housing section 218 and lower housing section 220. Suitable gears 296 are fixed to the output shaft 294 and engage a flexible link member, for example a chain 298. The other end of the chain 298 is connected to a gear 300 that is journaled to output shaft 230 of the motor 204. The motor 204 is indirectly connected to the upper flywheel mechanism 208 because of drive pulley 232 and to the output shaft 294 because of gear 300.

Referring to the FIG. 26 electrical schematic, the motor 204 and armature 288 of the upper flywheel mechanism 208 are in parallel with the motor 206 and armature 288' of the lower flywheel mechanism 210. The switch 306 is secured to the upper housing section 218 and completes its circuit when the frame 240 of the upper flywheel mechanism 208 advances to approximately the 0 degree position (see FIGS. 11 and 21). When the switch 306 is closed, the solenoid 276 is energized causing magnetic field 293 to become energized. As the frame 240 of the upper flywheel mechanism 208 advances, the switch 306 closes thus sending current to the capacitor 280 where it is charged.

Figure 20:
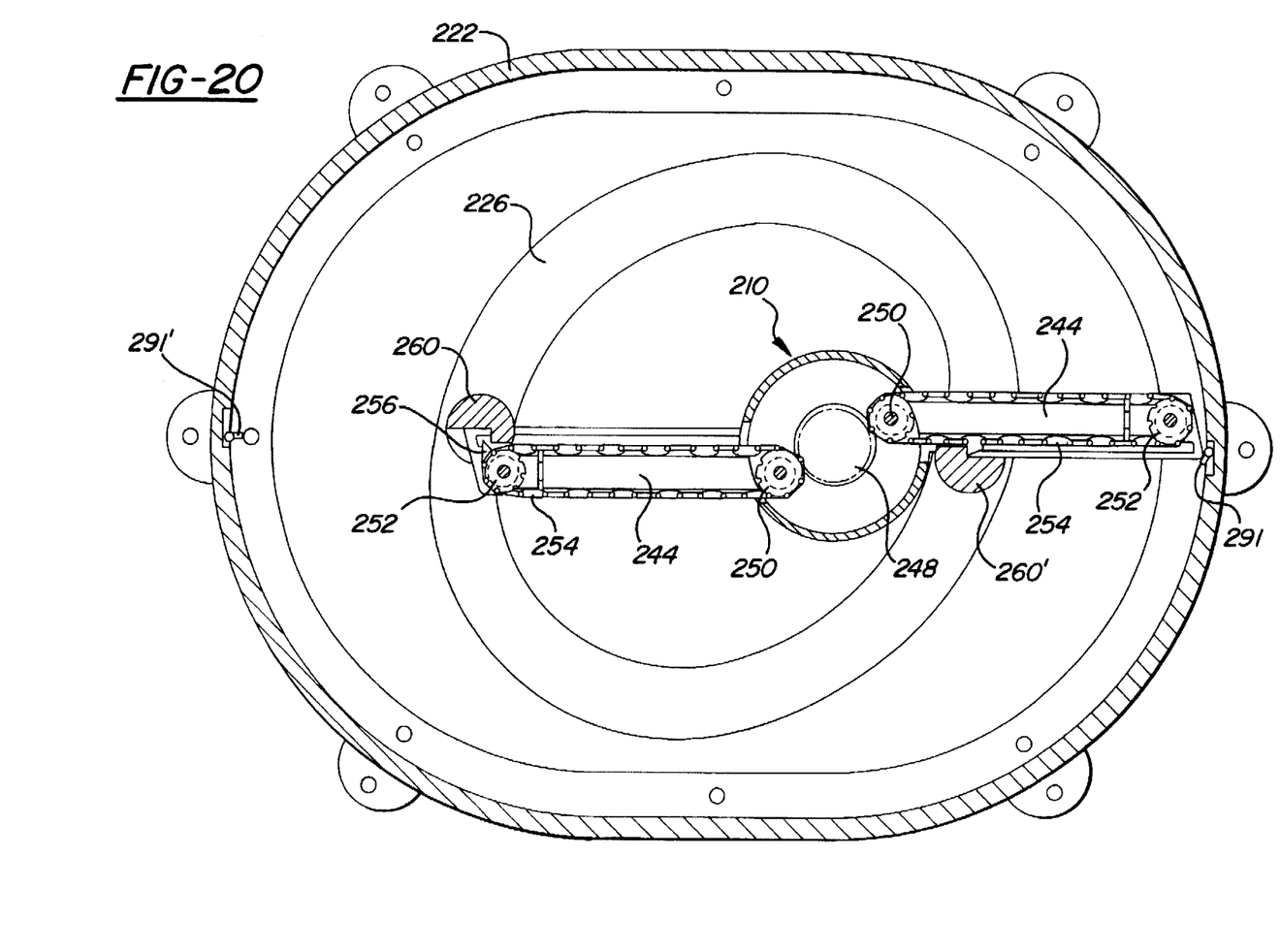
FIG. 20 is a top cross-sectional view taken along line 20—20 of FIG. 11, showing the housing, lower flywheel mechanism, and the weighted masses located within the track during a particular cycle.

FIGS. 20 through 25 depict various stages of operation of the electric motor drive system 200. Specifically, FIG. 20 is an enlarged view depicting the lower flywheel mechanism 210 at the instant in time where the weighted mass 260' is at its inner most position relative to lower flywheel mechanism 210. It is at this position when the mass 260' is released from the arm 244 and subsequently transferred to the upper flywheel mechanism 208 (not shown). At approximately the same time, the mass 260 is temporarily connected to arm 244 via catch mechanisms 264. The tang 256 that is connected to the chain 254 rides against the mass 260 and propels the mass 260 along track 226 as the chain 254 rotates clockwise. The faster the main gear 248 rotates, the faster the chain 254 rotates and propels the mass 260 along the path defined by the track 226.

Figures 21, 22, 23, 24, 25:
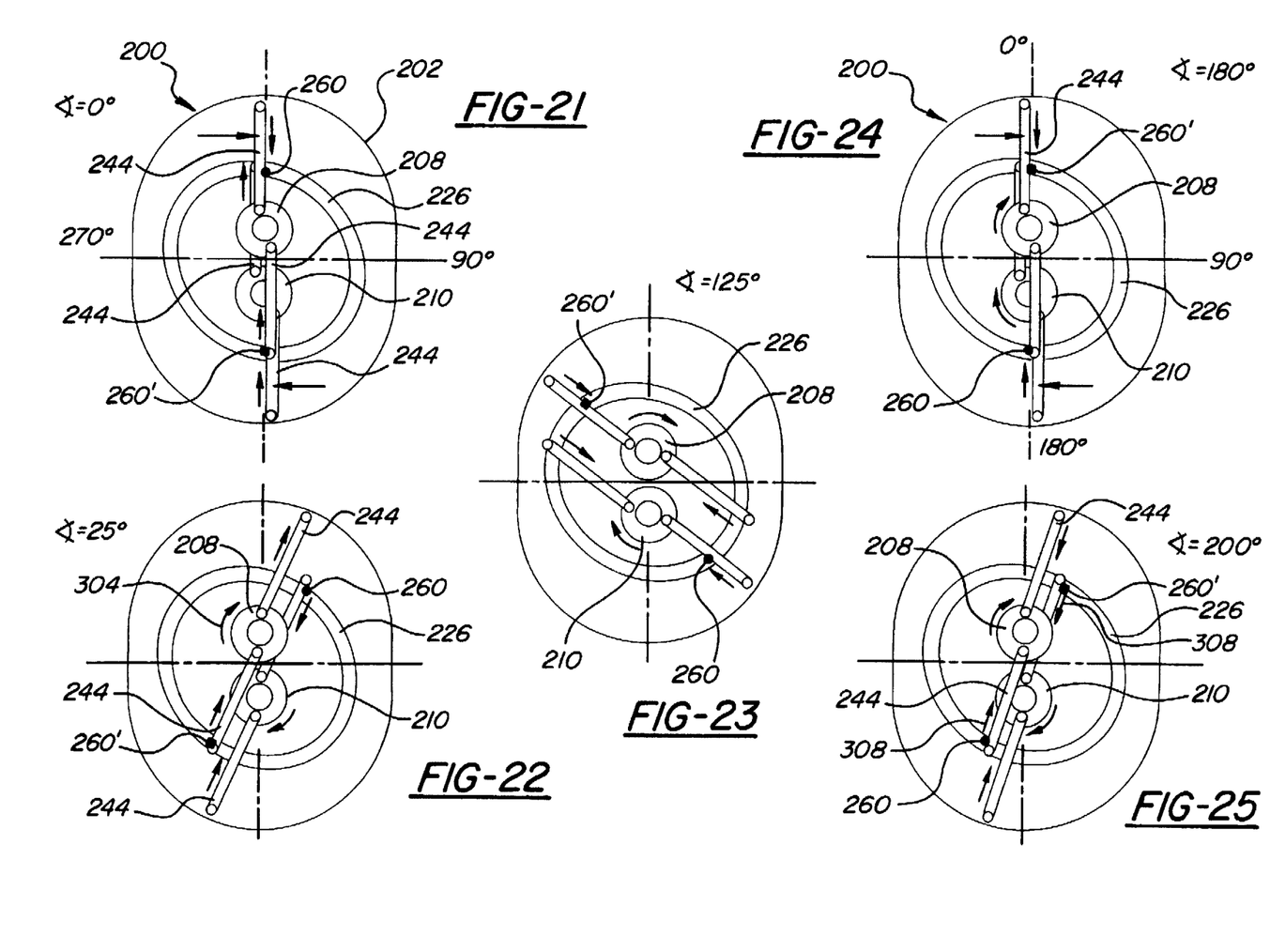
FIGS. 21 through 25 illustrate five different work cycles of the electric motor drive system and the advancement of the masses, by the flywheel mechanisms, within the track during each cycle.

FIGS. 21 through 25 are partial top views depicting various periods of a complete cycle of the motor unit 200. The upper flywheel housing mechanism 208 and the lower flywheel mechanism 210 are shown in relation to the housing 202 along with the masses 260 and 260' at certain periods of the cycle. For example, FIG. 21 depicts the 0 degree period where the mass 260 is just being released from the upper flywheel mechanism 208 and being connected to the lower flywheel mechanism 210. At this position, the mass 260 is at its outer-most position relative to the centerline of the lower flywheel mechanism 210. At this same 0 degree position, the other mass 260' is being disconnected from the lower flywheel mechanism 210 and is being connected to the upper flywheel mechanism 208. The mass 260' is now at its outer-most position relative to the centerline of the upper flywheel mechanism 208.

Referring to FIG. 22, the flywheel mechanisms 208 and 210 are illustrated in their 25 degree position. At this portion of the cycle, the arm 244 of lower flywheel mechanism 210 has begun to advance the mass 260 along the track 226. This is at least partially accomplished by the mass accelerator 214 thrusting the lower flywheel mechanism 210 in the direction of arrow 304. When the lower flywheel mechanism 210 has advanced to approximately the 25 degree position, the mass accelerator 214 becomes de-energized. This is accomplished by switch 302 recognizing the approximate 25 degree positioning of the arm 244 (see FIG. 11). At nearly the same time the accelerator 214 is energized, the mass accelerator 212 for the upper flywheel mechanism 208 is also energized thus causing the mass 260' to also rapidly advance between the 0 degree and the 25 degree period of the cycle. The mass accelerator 212 works in the same manner as previously described for mass accelerator 214.

FIG. 23 depicts the flywheel mechanisms 208 and 210 in their 125° positions. The masses 260 and 260' are nearing their inner most positions relative to their axes. FIG. 24 illustrates the system 200 at one-half cycle; the 180° position. Levers 291 and 291' (see FIG. 20) of switches 306 now sense the presence of the one arm 244 of each flywheel mechanism 208 and 210. One arm 244 of each flywheel mechanism 208 and 210 now engages masses 260 and 261' via mass releasing mechanism 268 (see FIGS. 16–19). This causes the catch pawl 266 to release the mass from the arm 244. A transfer of the masses now occurs as discussed previously in FIG. 21. That is, mass 260' now is picked up by the lower flywheel mechanism 210 while the mass 260 is picked up by the upper flywheel mechanism 208. Near the instant this transfer takes place, there is a loss of energy. This is compensated by activating the mass accelerators 212 and 214. This is accomplished by levers 291 and 291' activating electrical switches 306 and 306', respectively. This causes the solenoids 276 to be energized. The arm 244 of the upper flywheel mechanism 208 is abruptly advanced thus causing it to be positively connected to the mass 260' via the catch mechanism 264 (see FIG. 18). Once connected, the tang 256 of the chain 254 pushes the mass along the track 226. The solenoid 276 is de-energized by switch 302 when the upper flywheel mechanism 208 rotates to approximately the 25° position. At this time, the solenoid 276 is no longer being energized, but the capacitor 280 is being charged by the battery 236. As soon as the current is shut off to the solenoid 276, the armature 288 is returned back to its original position by the spring return mechanism 290 where it is then held in place by switch 306.

FIG. 25 illustrates the flywheel mechanisms 208 and 210 at their 200° positions. This represents a portion of the mass acceleration period that occurs shortly after the stage depicted in FIG. 24. After the mass accelerating time period of 0 degree to approximately 25 degree, the flywheel mechanisms 208 and 210 continue to be driven by motors 204 and 206, respectively. The masses 260 and 260' continue along the path defined by track 226 as long as the motors are energized. A component 308 of the force generated by the rotating masses 260 and 260' is transferred along the arms 244 of each flywheel mechanism 208 and 210. This force component 308 is partially transmitted to the output system 216 (FIG. 12) in order to drive a rotating component. By confining the component 308 with the rotational forces generated by the motors 204 and 206, an enhanced motor system 200 for driving a rotating component is created.

The foregoing discussion discloses and describes merely exemplary embodiments of the present invention. It is reasonably contemplated and within the scope of this invention to combine the various aspects of the embodiments disclosed herein in order to produce yet another embodiment. Nonetheless, one skilled in the art will readily recognize from such discussion, and from the accompanying drawings and claims, that various changes, modifications and variations can be made therein without departing from the spirit and scope of the invention as defined in the following claims.

What is claimed is:

1. An electric motor drive system comprising:
   a motor housing assembly;
   a first flywheel mechanism positioned within said motor housing assembly;
   a first motor for propelling the first flywheel mechanism, the first motor being secured to the motor housing assembly;
   a second flywheel mechanism positioned within the motor housing assembly;
   a mass operable to be exchanged between each of the flywheel mechanisms;
   a second motor for propelling the second flywheel mechanism;
   an output system connected to each flywheel mechanism for transferring energy stored by the mass to an output shaft.

2. The electric motor drive system as claimed in claim 1, wherein each flywheel mechanism includes a frame member connected to an input shaft, the frame members having an upwardly extending central portion and a pair of arms extending therefrom.

3. The electric motor drive system as claimed in claim 1, further comprising an accelerator system for energizing each flywheel mechanism at a predetermined location during a cycle of operation and imparting motion to each flywheel mechanism.

4. The electric motor drive system as claimed in claim 1, wherein each flywheel mechanism has a main gear secured to a shaft, a pair of inner gears driven by the main gear, and a pair of satellite gears connected by linkage to the inner gears for advancing the mass within a track of the motor housing assembly.

5. The electric motor drive system as claimed in claim 1, wherein said motor housing assembly includes a pair of symmetrically-shaped outer housing covers and a central housing disposed therebetween, which together define a track for guiding the mass that is connected to said flywheel mechanisms.

6. The electric motor drive system as claimed in claim 1, wherein the mass includes a release mechanism to assist the mass from being transferred from one flywheel mechanism to the other.

7. The electric motor drive system as claimed in claim 1, wherein the mass includes a set of guide rollers for guiding the mass within a track that is defined by the motor housing, the mass being located within the track for generating a centrifugal force proportional to the rotational velocity of the rotating output shaft.

8. The electric motor drive system as claimed in claim 3, wherein said accelerator system includes an articulating member that is pivotally connected to the motor housing assembly, the acceleration system further includes a spaced apart oppositely charged solenoid, the articulating member being operable to engage a flywheel mechanism and rapidly advance it towards the solenoid.

9. The electric motor drive system as claimed in claim 8, wherein the articulating member is energized at approximately a zero degree position and is de-energized at approximately a 25 degree position.

10. The electric motor drive system as claimed in claim 1, wherein the output system includes a first shaft connected to a flywheel mechanism, a gear connected to the first shaft, the output shaft, and a flexible member connecting the shafts.

11. An electrodynamic motor drive system comprising:
a three piece motor housing assembly including two outer housing cover sections and a center housing section the sections together defining an inner pathway;
a first rotating mechanism positioned within said motor housing assembly, said first rotating mechanism including a weighted mass that travels within the pathway;
a second rotating mechanism positioned within said motor housing assembly, said second rotating mechanism including another weighted mass that travels within said pathway;
a pair of motors for driving each rotating mechanism, each motor being secured to the motor housing assembly;
a timing system for connecting the first and second rotating mechanisms to a common output shaft for synchronizing the operation of said motor drive system.

12. The electrodynamic motor drive system according to claim 11, wherein each rotating mechanism is comprised of:
a centrally located housing having a pair of outwardly extending arms and a shaft journaled therein;
a main gear connected to an upper portion of the shaft;
first and second inner gears driven by the main gear;
first and second outer gears located at outer ends of each arm;
a first linking member connecting the first inner gear to the first outer gear;
a second linking member connecting the second inner gear to the second outer gear; and
a tension mechanism secured to one of the arms for maintaining tension on one of the linking members.

13. The electrodynamic motor drive system according to claim 11, wherein said timing system includes a first flexible drive member connected to one of the motors and the common output shaft, and a second flexible drive member connected to the other motor and the common output shaft.

14. The electrodynamic motor drive system according to claim 11, further comprising a mass accelerator for boosting each rotating mechanism at a predetermined time period during each cycle in order to accelerate the weighted masses.

15. The Electrodynamic Motor Drive System according to claim 14, wherein the mass accelerator is comprised of:
a shaft extending through one of the housing sections;
a swing arm fixed to the shaft for engaging a rotating mechanism;
an armature connected to one end of the shaft;
a solenoid spaced apart from the armature and defining a magnetic field therebetween;
a switch for energizing the magnetic field when the rotating mechanism advances and engages the switch;
another switch for de-energizing the magnetic field when the rotating mechanism advances approximately 20°.

16. The electrodynamic motor drive system according to claim 11, wherein the output shaft extends through each housing cover sections.

17. A method of operating an electrodynamic motor system comprising the steps of:
providing a housing with an inner guide, first and second electric motors located within said housing, first and second flywheel mechanisms to be driven by the motors, a pair of weighted masses connectable to each flywheel mechanism, and an output system connecting each flywheel mechanism to a common output shaft;
activating the electric motors to cause each flywheel mechanism to rotate;
advancing the mass connected to each flywheel mechanism along a path defined by the guide;
exchanging the masses that are connected to the first and second flywheel mechanisms approximately every 180 degrees of rotation;
re-energizing the masses after the exchanging step to cause enhanced rapid movement of each mass along the path; and
combining the energies derived from rotating each flywheel mechanism via the output system in order to rotate the common output shaft.

18. The method of operating an electrodynamic motor system as claimed in claim 17, further comprising the step of storing in a capacitor excess energy that is generated when the system is not re-energizing the masses in order to recharge a magnetic field.

19. The method of operating an electrodynamic motor system as claimed in claim 17, further comprising the steps of moving the mass within the guide to generate forces that increasingly build as the mass is rotated, transferring a component of the force to the output shaft to cause rotation thereof.

20. The method of operating a motor system as claimed in claim 17, wherein the re-energizing step includes rapidly advancing the weighted mass when the mass is at a certain location within the guide.

* * * * *